United States Patent [19]

Morrison, Jr. et al.

[11] 4,090,456
[45] May 23, 1978

[54] FURROW OPENER AND APPARATUS FOR NO-TILLAGE TRANSPLANTERS AND PLANTERS

[75] Inventors: John E. Morrison, Jr., Lexington, Ky.; Charlie F. Abrams, Jr., Raleigh, N.C.

[73] Assignee: The United States of America as represented by the Secretary of Agriculture, Washington, D.C.

[21] Appl. No.: 618,971

[22] Filed: Oct. 2, 1975

[51] Int. Cl.² ............................................. A01C 23/02
[52] U.S. Cl. .......................................... 111/3; 111/52; 111/85; 172/139; 172/611; 172/538
[58] Field of Search ................... 111/2, 3, 15, 688, 20, 111/21, 22, 52, 53, 54, 55, 36, 65, 81, 24, 60, 61, 62, 63, 64, 66, 31, 84, 88; 172/138, 139, 140, 141, 383, 538, 539, 603, 613, 615, 681, 776, 145, 146, 147, 611, 657, 658, 619, 633

[56] References Cited

U.S. PATENT DOCUMENTS

| 343,907 | 6/1886 | Kissner et al. ..................... 111/60 |
| 653,298 | 7/1900 | King ................................. 111/3 |
| T862,011 | 5/1969 | Koronka et al. ................... 111/88 |
| 1,073,702 | 9/1913 | Owens ............................... 111/3 |
| 2,791,192 | 5/1957 | Ryding ............................. 111/3 |
| 2,944,495 | 7/1960 | Wilson et al. ...................... 111/2 |
| 2,960,944 | 11/1960 | Poll ................................ 111/2 |
| 3,701,327 | 10/1972 | Krumholz .......................... 111/81 |
| 3,799,079 | 3/1974 | Dietrich ........................ 172/145 X |

FOREIGN PATENT DOCUMENTS

| 495,821 | 9/1950 | Belgium ........................... 172/538 |
| 9,275 | 5/1906 | Denmark ........................... 111/88 |
| 1,245,767 | 10/1960 | France ............................. 111/3 |
| 204,756 | 10/1967 | U.S.S.R. ........................... 111/2 |

*Primary Examiner*—Edgar S. Burr
*Assistant Examiner*—James R. Feyrer
*Attorney, Agent, or Firm*—M. Howard Silverstein; David G. McConnell; Salvador J. Cangemi

[57] ABSTRACT

A new apparatus for opening furrows in soil is disclosed. Specifically, this apparatus consists of an opening mechanism, a closing mechanism, an automatic seed planting mechanism, an automatic seedling planting mechanism, a driving means, a towing means, and the salient component parts necessary to make them function.

13 Claims, 13 Drawing Figures

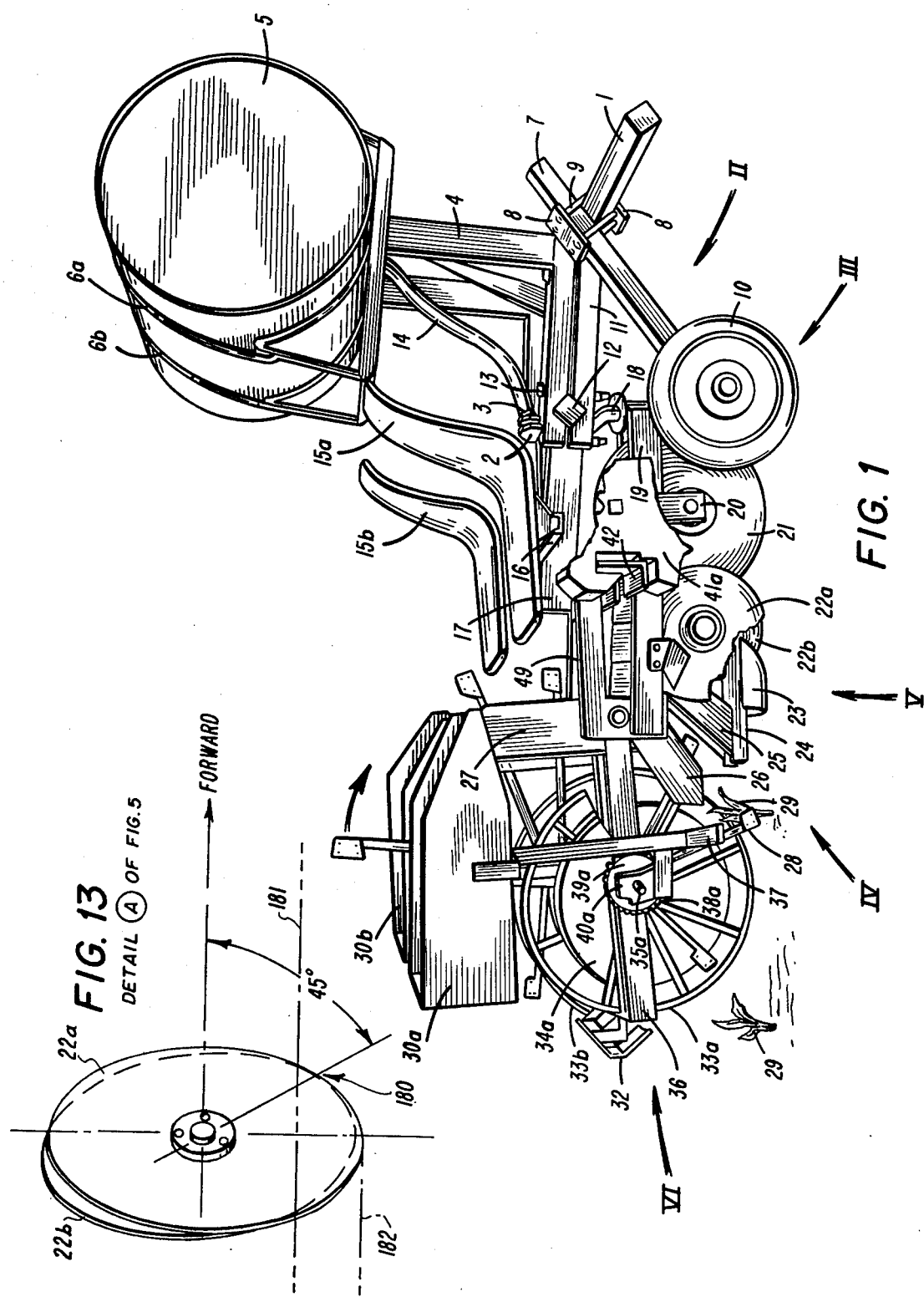

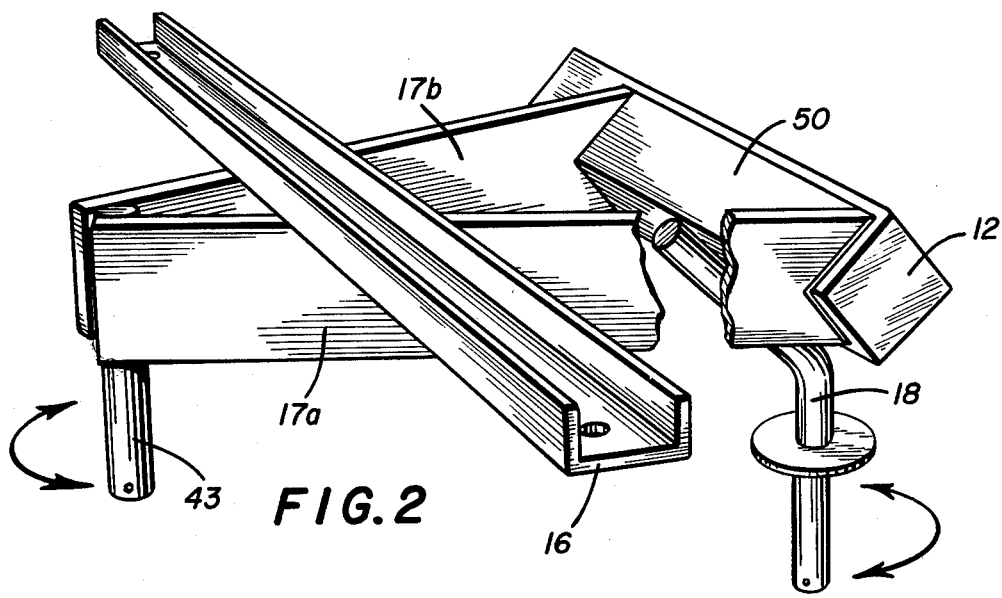
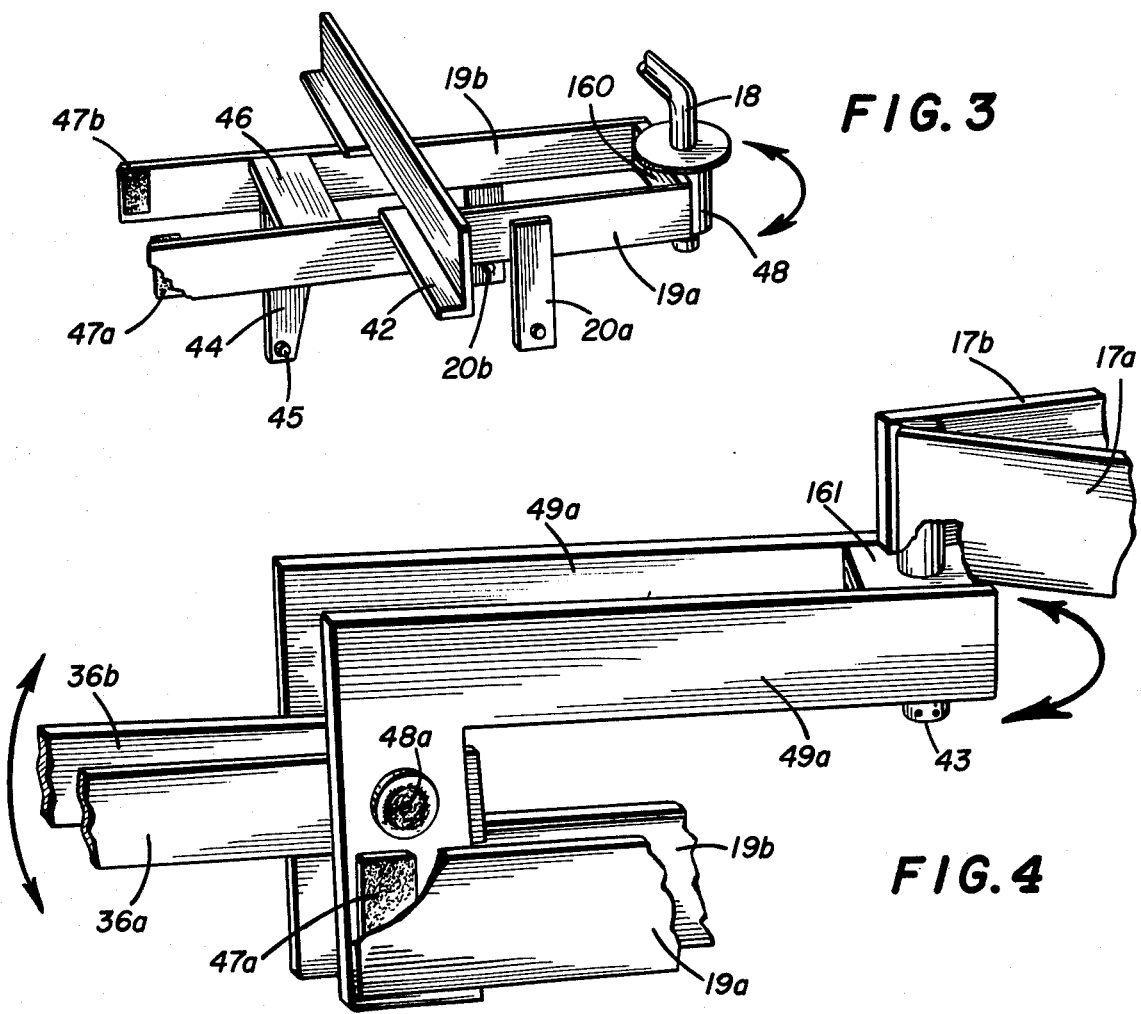

DETAIL (A) SHOWN IN FIG. 13

FURROW OPENER AND APPARATUS FOR NO-TILLAGE TRANSPLANTERS AND PLANTERS

PRIOR ART AND BACKGROUND OF INVENTION

This invention relates to an apparatus for furrow opening. More specifically, it is a soil opening apparatus used with tillage and planting machinery.

No-tillage is a planting system whereby a crop is planted directly into an essentially unprepared seedbed. It means the elimination of any tillage operations from the previous crop through harvest other than what is necessary to properly place and cover the seed.

There are three main areas in a no-tillage planting system which require adequate management, materials and equipment; namely, development and utilization of a surface mulch, application of herbicides and insecticides without tillage and planting (or transplanting) with minimum mulch disturbance. The mulch is used for moisture conservation and to protect the field surface from wind and water erosion. The herbicides and insecticides establish a seedbed free from competition by killing the cover crop to convert it into a mulch and by controlling weed growth and insect pests. The planter cuts through the mulch to open a furrow in the soil sufficient to deposite seed (or plants) and closes the furrow.

Special machine requirements must be met. No-tillage planters must be designed to be flexible enough to tranverse moderate undulations without effecting the planting depth on any row and to have components which will track around contour curves. In areas where the benefits from the control of wind and water erosion control are the greatest, no-tillage planters and transplanters will need to operate through wide ranges of soil hardness and moisture conditions in the same field. Although no-tillage planting in mulches gives better yield responses in crusting, non-fracturing soils, the practice has already spread to other soil types. Basic requirements of a no-tillage planter opening unit are that it floats over subsurface obstructions and plants at the desired depth across a field moist enough for seed germination but dry enough for tractor mobility.

The instant novel soil furrow opener, which we term the "combination-opener," consists of a smooth rolling coulter operating deeper than the desired furrow depth and a pair of discs mounted at appropriate angles (5° at 45° from horizontal) so that they contact the rolling coulter at or slightly below the soil surface and so that they open a furrow the minimum desirable width for deposition of transplants or of seed.

Soil penetration with the combination opener is achieved by applying vertical force downward either by direct weighting with ballast or by weight transfer through a device such as springs from the weighted machine frame. The prototype transplanter uses direct ballast weights on the opener frame. Direct ballast applies best to one-row machines. The prototype planter is a demonstration of the use of weight-transfer springs. Weight-transfer methods allow flotation of each row unit of a multiple-row machine while maintaining adequate downward force and while furrow depth is maintained by devices such as depth bands (as used on the prototype planter) or by gauge wheels. Vertical penetration force varies considerably with field conditions. We suggest using 600 pounds per row unit to facilitate operation in the hardest soil condition that we have encountered. The weight of riding operators on transplanters is considered as part of the 600 pounds but planting units will require the total in ballast excluding seed and fertilizer weight.

Furrow depth is controlled by using gauge wheels on the supporting tool bar for the one-row prototye transplanter. This would possibly be adequate also for two-row machines. Seed planting depths may require closer control than transplanting depths and planters are normally used in four-row or larger combinations. For these reasons, each planter row unit must be individually suspended so that it can follow terrain undulations by using either depth bands (from conventional double-disc opener planters) on each disc or by using gauge wheels mounted on one or both sides of each unit.

No-tillage transplanters using double-disc openers or combination-openers require a pair of narrow wing-smounted behind the discs and operating below the soil surface to hold the furrow open for transplant deposition.

Seed planters deposit seed between the discs of the combination-opener with the seed tube placed forward so that the discs do not move soil into the end of the tube and so that the seed falls where the furrow is opened the widest. A seed firming wheel is spring-loaded and mounted to track behind the seed tube and between the trailing portion of the two discs. Because of the narrowness of the furrow and because of its natural tendency to close after passage of the two discs, the seed firming wheel is also narrow. It consists of a disc $\frac{1}{4}$ to $\frac{3}{4}$ in. thick and 9 in. in diameter mounted similar to conventional 1-in. by 10-in. rubber seed firming wheels.

Furrow closure under no-tillage field conditions has been a constant problem with conventional no-tillage planters. The problem appears to be associated with generally uncontrolled tracking between cutting coulters, furrow openers and rear press wheels. The combinationopener design provides cutting and furrow opening functions without tracking problems and with a minimum soil disturbance. The resulting furrow is a cleanly cut slit in the soil and surface trash. Closure of this furrow requires the application of pressure upon the upraised soil directly adjacent to the open slit. This must be performed on both sides of the furrow. We have found that a pair of narrow weighted press wheels with their axles set at 20° (transplanter) or 10° to 15° (planter) from horizontal, so that they are closest together at bottom-dead-center, conform to the natural shape of the furrow edge and effectively close the furrow as they closely trail the combination opener. This wheel system is used for our transplanter and planter prototypes. The edges of the wheels are $\frac{1}{2}$ in. wide and taper to $1\frac{1}{2}$ in. wide. They also provide traction for driving the transplating plantchain and seed hopper mechanisms, respectively. The transplanter press wheels are 22 in. in diameter and weigh 100 lb. each. They effectively close furrows which are nominally 3.5 in. deep. The planter press wheels are 14 in. in diameter and weigh 70 lb. each. They effectively close furrows which are 1 in. to 2 in. deep, depending upon the crop. The press wheels on both machines are hinged to allow flotation over undulated terrain independent of vertical movement of the combination-opener frame. This hinging allows constant furrow-closing pressure independent of the penetration force required for the combination-opener.

Components in row units must track one another if their functions are to be properly executed. Tracking becomes especially critical when multiple row units are combined, when transplanting or planting is to be done on curved or contoured rows, and when operating on side slopes. The combination-opener and press wheels can be pivot-mounted so that they track almost perfectly. The combination-opener frame is pivotmounted from the tool bar on a vertical post similar to the mounting of a rolling coulter on a moldboard plow. This allows the combination opener to pivot in response to changes in direction of travel. The vertical post is positioned ahead of the rolling coulter and discs so that they tend to run on a straight line or smooth curve rather than leading off to one side or the other.

The rear press wheels must also track. This is extremely important in the case of the transplanter because non-tracking would damage the transplants in the row. A second pivot point with a vertical post is provided for the rear press wheels. In the case of the transplanter, it is mounted on a special frame attached to the tool bar to avoid blocking the open-center frame which is the path for the transplants. Extensions of the combination-opener frame guide the rear press wheel frame, at a point described by the intersection of tangents to their turning arcs so that near-perfect tracking is achieved. Other designs may give the same performance. In the case of the planter, the vertical pivot post is mounted on the rear of the combinationopener frame and guidance is not required. Both machines track at the selected minimum turning radius of 50 ft. and on side slopes.

OBJECTIVES

It is the principal object of this invention to provide a furrow opener and apparatus for no-tillage transplanters and planters.

It is another object of this invention to provide furrow opening with minimum soil disturbance and with minimum deposition of soil upon the original field surface.

A third object of this invention is to provide furrow opening ability in dry hard soils and through previous-crop residue.

A fourth object of this invention is to achieve machine flotation over undulated terrain.

A fifth object of this invention is to achieve machine component tracking on curved rows and across side slopes.

A sixth object of this invention is to provide adequate furrow closure around transplant seedlings and over deposited seed.

A seventh object of this invention is to achieve seed firming in the bottom of the furrow.

An eighth object of this invention is to provide a compact, easily usable, rugged, and practical machine.

Other objects and advantages of this invention will further become apparent hereinafter and in the drawings, in which:

FIG. 1 is an isometric view of the transplanter version of the furrow opener.

FIG. 2 is an isometric view of the upper frame assembly.

FIG. 3 is an isometric view of the front frame assembly.

FIG. 4 is an isometric view of the method of attachment of the upper frame assembly to the middle frame assembly to the dual rear press wheel assembly.

Figure 5:
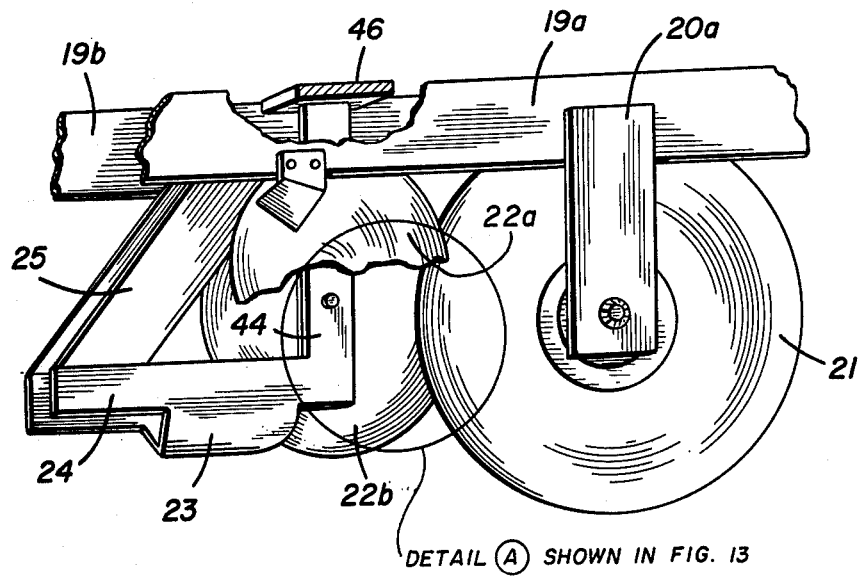
FIG. 5 is an isometric view of the opener assembly mounted on the front frame.

FIG. 13, Detail A is taken from FIG. 5 and shows the location of the circumferential point where the two discs 22a and 22b are closest together.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Figure 6:
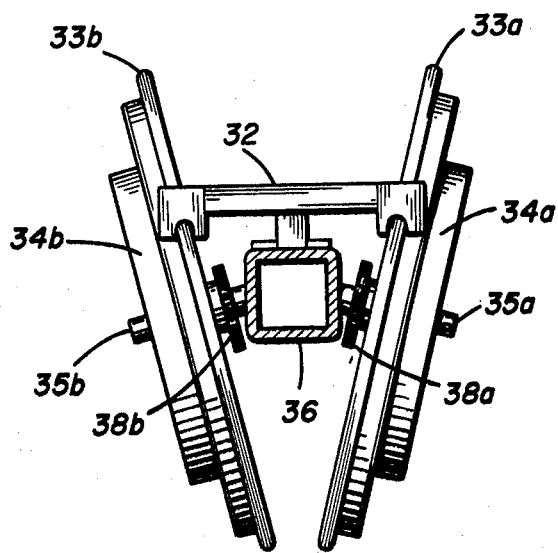
FIG. 6 is an isometric view of a rear view of the dual rear press wheel assembly.

Turning now to the specific embodiment of the invention illustrated in the drawings, where the transplanter version of the invention is shown in FIG. 1, through FIG. 6. Following FIG. 1, a typical tool bar 1 affixed with two depth-gauge wheel 10 supported by adjustable struts 7 each secured by four bolts 9 through two plates 8 to tool bar 1, is attached to a farm-type tractor equipped with a powered lift. A tool-carrier trailer would perform the same function as the above tool bar and gauge wheel assembly. A water tank 5 is mounted on tool bar 1 by strut assembly 4 and secured by rods 6a and 6b. Hose 14 leads from the barrel to a conventional water metering valve (not shown). Tool bar frame extensions 11 supporting a second tool bar 12 are secured with bolts 13. The one-row unit of a transplanting machine is attached by two conventional tool bar clamps 2 secured by bolts 3. As seen from FIG. 1, and 2, clamps 2 secure angle-iron 50, FIG. 2, to tool bar 12. Frame members 17a and 17b are angled from either end of 50 to meet against vertical rear pivot shaft 43 which is on the centerline of the machine. Seat support beam 16 is rigidly fastened to 17a and 17b for bolted attachment of worker seats 15a and 15b. The front frame pivot shaft 18 is rigidly fastened to 50. As seen in FIG. 3, the front frame is pivotally attached to shaft 18. Side rails 19a and 19b are rigidly fastened to pivot block 48 which is fastened to a front crossmember 160. Vertical struts 20a and 20b are rigidly mounted onto the side rails 19a and 19b respectively and provide mounts for a conventional smooth-type, approximately 17-inch diameter rolling coulter 21, FIG. 1, which is positioned verticaly on the centerline of the machine. Crossmember 46 FIG. 3, provides a rigid support for vertical strut 44 with mounting pads 45 on each side, each for attachment of a conventional flat disc 22a and 22b, located on each side of strut 44, FIG. 1 and 3, as used on planter double disc furrow openers. The pads 45, FIG. 3, are angularly mounted so that each of the flat discs 22a and 22b are angled to enable their outer edges to be closed together where they are positioned on either side of the rolling coulter and below the soil surface level. (See FIG. 5 and 13). The closest point of reference 180 on the circumference of said discs 22a and 22b which is critical to the furrow opening process being determined as follows: Draw a circle and bisect it with horizontal and vertical lines through the center, let that circle represent the face of said discs, and in the lower right quadrant bisect the circumference of the circle with a radius of 45° below the horizontal. That point on the circumference will represent the closest point at which the discs must come together and will achieve the optimum result. The flat discs 22a and 22b so angularly mounted and operated below the surface of the soil, 181 laterally move soil in both directions forming a furrow. FIG. 13 shows furrow bottom 182. As seen in FIG. 5, a V-shaped boot 23 adapted from a double-disc corn planter opener may be used to follow in the furrow. A pair of approximately parallel wing members 24, rigidly attached to the boot and extending backward along the furrow operate below the top of the soil surface and hold the forrow open for deposition of plants in the furrow. Plant guides 25 on either side of the centerline extend down to wings 24 to guide seedling plant roots into the furrow. This completes the description of the novel soil furrow opener which consists of rolling and cutting discs to first cut through debris and hard soil and then to open the furrow with minimum of soil movement and minimum of soil deposition upon the soil surface.

Ballast weight for soil penetration is provided by multiple cast iron weights 41a and 41b. 41a is shown on FIG. 1. 41b is not shown but would be opposite and parallel to 41a. 41a and 41b are secured on weight frame 42, FIG. 1 and 3, directly over the furrow opener.

The front frame assembly shown in FIG. 3, pivoting on 18 allows the furrow opener to freely track on a curved path when the towing tractor is being turned from a straight path. Bearing pads 47a and 47b FIG. 3, laterally bear on rear frame members 49a and 49b, FIG. 4, so as to turn the rear frame about pivot shaft 43 when the tractor is being turned. This action effectively steers the rear press wheels along the same curved path as taken by the furrow opener. This steerage is made possible by designing the frame members so that the bearing pads 47a and 47b, FIG. 3, are at the point of intersection of the centerline of the furrow opener and the centerline of the rear press wheel assembly when each of these are both following the same curved path. Alternate frame designs (not shown) can produce this same component-tracking function.

The rear press wheel frame members 36a and 36b, FIG. 4, are pivotally attached by bolts 48a and 48b (not shown) since it is parallel to and opposite of side 48a. This allows vertical "flotation" of the rear press wheels without altering the working depth of the furrow opener. Dual rear press wheel assemblies are conventionally journaled onto angled axle shafts 35a and 35b, FIG. 6, so as to move loosened soil on both sides of the opened furrow back into the furrow around the deposited seedling plant 29, FIG. 1, so that the plant roots and lower stem are completely covered and firmed in the soil. The press wheel rims are necessarily narrow and may have ribs circumferentially attached such as 33a and 33b, FIG. 6, to concentrate the wheel pressure at the edge of the open furrow. Wheel angle is a conventional 12° to 15° from vertical for transplanting machines. Press wheel ballast weights 34a and 34b are rigidly secured to each wheel to supplement rear press wheel pressure. The amount of weight is determined by the condition of the terrain.

Chain sprockets 38a and 38b rigidly fastened to each rear press wheel drive the planting arms 28, FIG. 1, by means of chain 40a and 40b (not shown but opposite 40a) to sprockets 39a and 39b (not shown but opposite 39a). This is a conventional planting arm drive and arm system. Workers individually place transplants, carried in boxes 30a and 30b, into grippers on arms 28 as they travel past them. Shields 27 and 26 on both sides of the machine activate the arm grippers to hold and release the plants. Workers rest their feet on foot rest 37.

Rear press wheel scraper assembly 32, FIG. 6, is flexibly mounted onto the rear of frame 36. Scraper shape corresponds to press wheel rim shape to remove sticking soil.

Alternate types of plant gripping and deposition systems could be used behind the furrow opener without change of furrow opening and closing functions and if mounted compatible with frame geometry explained above, acceptable machine component tracking and flotation may be achieved.

Figure 7:
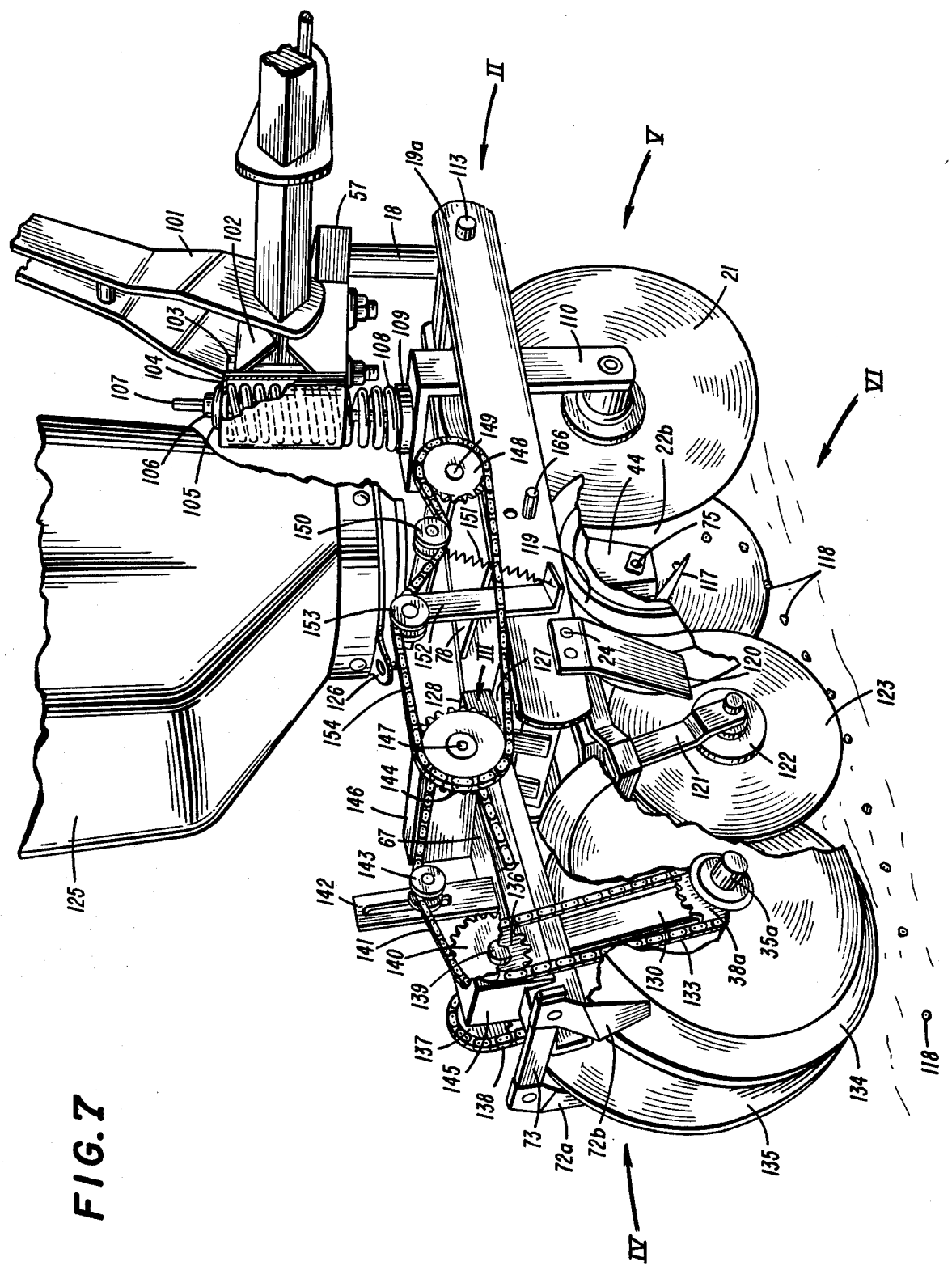
FIG. 7 is an isometric view of the seed planter embodiment of the opener.
Figure 8:
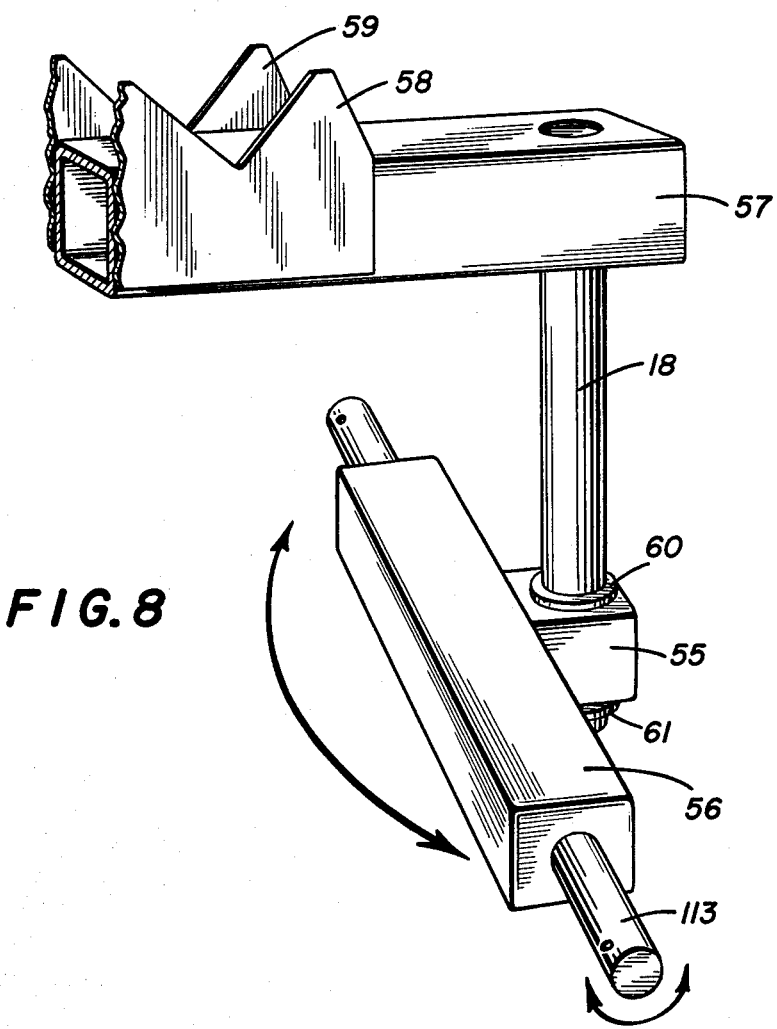
FIG. 8 is an isometric view of the front support.
Figure 12:
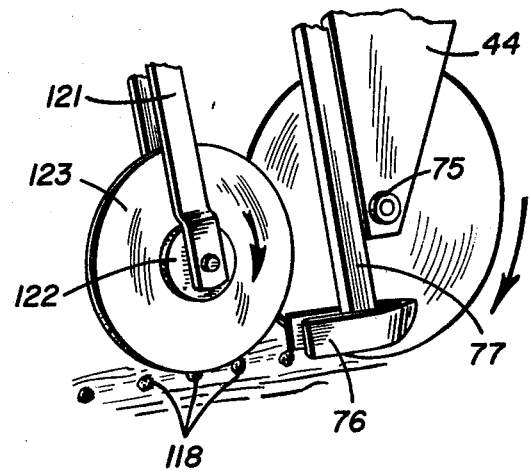
FIG. 12 is an isometric view of the optional furrow opener boot.

The seed-planter version of the invention is shown in FIG. 7, through FIG. 12. Following FIG. 7, a typical tool bar assembly 101 is affixed with gauge wheels or tool-carrier transport wheels (not shown) is attached to a farm-type tractor equipped with a power lift means. The entire planter assembly is illustrated as being of the unit-planter type for variable positioning along the tool bar or tool-carrier frame. Other fixed row spacing attachments may be used without deviating from the function of the invention. The front support, FIG. 8, is comprised of a tubular bar 57, fitted with two vertical plates 58 and 59 to fit a standard tool bar. This front support is secured to tool bar 101, by a conventional clamp 102, and two long bolts 103. As seen in FIG. 7, bar 57, supports compression cylinder 104 which contains compression spring 108, which transfers weight from the tool bar frame and keeps the mechanism vertically flexible over rough terrain, guided by rod 107, with a rod-stop 106, and washer 105, limiting the travel of the compression spring 108, and providing a lifting means for the whole unit planter. Rod 107, is pivotally attached to frame or arch 110, which comprises 20a and 20b of FIG. 3 for effecting the machine lifting force. Ring 109, on arch 110, positions the base of spring 108.

Bar 57 also supports the front vertical pivot shaft 18 which allows angular motion of the entire unit planter and in particular of the furrow opener to follow a curved path when the towing tractor is also turning on a curved path. Pivot assembly, FIG. 8, consists of a vertical pivot journal block 55 restrained from vertical movement by affixed washer 60 and pin 61. Block 55 is rigidly affixed to horizontal journal block 56 with shaft 113 rotationally free within block 56. Planter "flotation" is effected by rotation of shaft 113.

The front frame member assembly consists of side members 19a and 19b, FIGS. 7 and 9, rigidly affixed to support arch 110 and other crossmembers functionally described later. Arch 110, provides mounts for a conventional smooth-type, approximately 17-in. dia. rolling coulter 21, FIG. 7, positioned vertically on the centerline of the machine. Crossmember 78 provides a rigid support for conventional seed metering mechanism base 126, affixed with seed hopper 125. The type of metering mechanism is not pertinent to the invention and a seed tube communicating with a remote seed reservoir and/or metering mechanism would be functionally compatible. Crossmember 78 also provides a rigid support for vertical strut 44 with mounting pads 75 on each side, each for attachment of a conventional flat disc 22a, and 22b on each side of strut 44 as used on planter double disc furrow openers. Disc mounting and function is identical to those of the transplanter version, FIG. 5.

Figure 11:
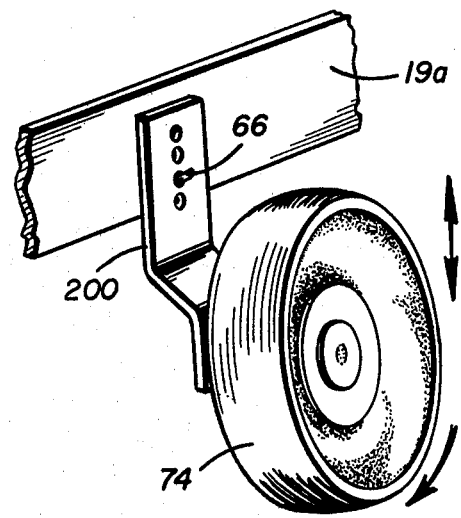
FIG. 11 is an isometric view showing how the depth gage wheel is fastened to the front frame.

The furrow opening discs are fitted with adjustable soil scrappers 120 and conventional depth-controlling rings 119, available in various diameters for various planting depths. An alternate depth control means, FIG 11, is accomplished by adjustably affixing a depth gauge wheel assembly 74 on a strut 200 on each side of the planter by affixing strut 73 with pin 66 onto frame members 19a and 19b. Only one of the two depth control means would be used at any one time. Seed 118, FIGS. 7 and 12 from a metering mechanism 126 or other means drops down seed-tube 77 and is directed into the open furrow either by angled deflector 117 or seed boot 76, FIG. 12. Other seed tube designs which do not limit the furrow opener function may be used without reducing the value of the invention.

Seed firming wheel 123, mounted on bearing hub 122, and supported by pivoting bracket 121, in a conventional manner, presses seed 118 into contact with soil in the bottom of the open furrow. Wheel 123, may be a disc fabricated from metal or a flexible material such as semi-rigid plastic or natural or synthetic rubber. Wheel 123 is ¼ inch to ¾ inches in thickness with adequate performance having been demonstrated with a ½-inch thickness disc 9 to 10 inches in diameter. Wheel 123 may be spring-load (not shown) in a conventional manner for exerting more force upon the seed.

Figure 9:
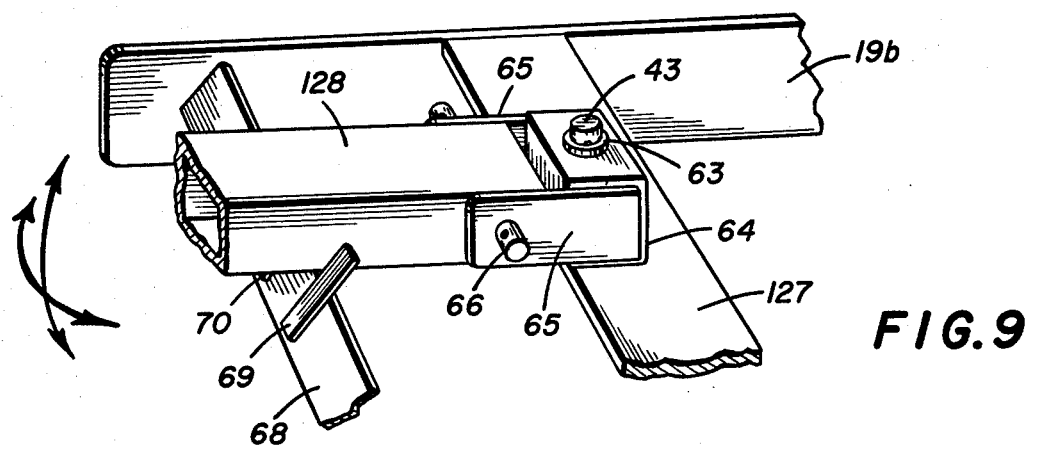
FIG. 9 is an isometric view of the pivoting attachment of the rear frame to the front frame.
Figure 10:
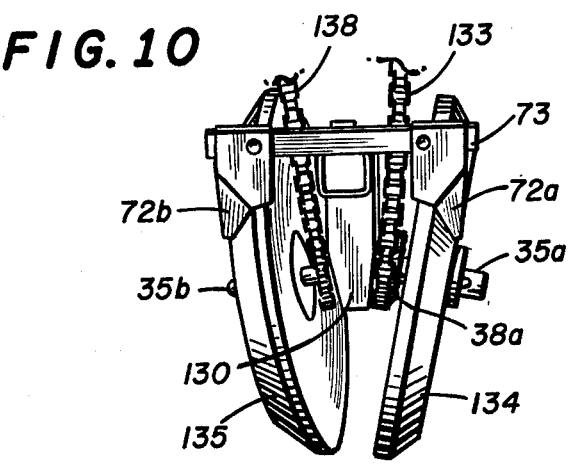
FIG. 10 is an isometric view of a rear view of the dual rear press wheel assembly.

As illustrated in FIG. 9, the rear frame 128, is laterally pivoted by means of vertical pivot shaft 43 rigidly affixed to crossmember 127 on the machine centerline, at the point of intersection of the centerline of the furrow opener, assembly and the centerline of the rear press wheels, so that the rear press wheels will travel on the very same curved path as followed by the furrow opener when the towing tractor is turning. Vertical movement on shaft 43 is restrained by washer and pin assembly 63. Journal block 64 on shaft 43 has two projections 65 each with a hole for horizontal pivot pin 66 which passes through projections 65 and frame tube 128. Pin 66 allows vertical flotation of the rear press wheels without altering the function of the furrow opener. Crossmember 68 with stops 69 and 70 provides lifting means for the rear press wheel assembly and lateral pivoting limitation to avoid drive chain disengagement during transport. Rear press wheel assembly as shown in FIGS. 7 and 10, consists of tubular frame 128 with a rigidly attached perpendicular strut 130 with wheel axle shafts 35a and 35b rigidly attached at an angle typically 10° to 15° from vertical. Press wheels 134 and 135 are solid metal to provide ballast weight to act on the edges of the open furrow to close it over the deposited seed 118. The press wheels have narrow ½-inch wide rims to concentrate the force upon the edge of the open furrow. Design and function of the rear wheels on the transplanter and planter versions of the invention are of identical intent. Drive chain sprockets 38a and 38b (not shown) are rigidly attached to the side of each press wheel to provide driving power through chain 133 and 138 to sprockets 136 and 137 on either end of shaft 139 journaled in bearing block 145. Changeable sprocket 140 drives chain 141 to sprocket 144 on shaft 147 journaled in bearing block 146. Changeable sprocket 79 also on shaft 147 drives chain 154 over spring loaded 151, tightener 152, with tightener spools 153 and 150, to changeable sprocket 148 on shaft 149 communicating with metering mechanism 126. The drive assembly may also provide a power drive to an auxillary insecticide metering mechanism from shaft 139 (auxillary drive not shown).

Journal blocks 145 and 146 and chain tightener 142, with tightener spool 143, are rigidly mounted on slidable plate 67 bolted onto frame 128 so as to effect tension adjustment in chains 133 and 138. Wheel scraper blades 72a and 72b, FIG. 10, shaped to conform to press wheel shapes and bolted onto strut 73 which is bolted onto frame 128.

Drive may be provided by a common jackshaft across a tool-carrier frame and eliminate the need for providing drive means from the rear press wheels without changing the intent or functional value of the invention. Other means of providing force on side members 19a and 19b to obtain adequate soil penetration with the furrow opener may be ballast weights as illustrated on the transplanter version, FIG. 1, or leaf spring (s), or hydraulic pressure applicator, or other means if the frame is free to laterally pivot about 18 to follow a curved path when the towing tractor is turning. As illustrated in FIG. 7, the tool bar 101 or substitute tool-carrier provides ballast weight transferred through spring 108 to the furrow opener. Additional ballast weight may be added to the tool bar for additional weight transfer.

Having thus described our invention, we claim:

1. An apparatus for the opening of furrows under no-tillage conditions comprising:
   (a) a first angle tool bar set at an angle to the horizontal;
   (b) two depth gauge wheels;
   (c) strut members adjustably secured at one end to said first tool bar and rigidly secured at the other end to said depth gauge wheels;
   (d) a liquid reservoir mounted to the first angled tool bar, said reservoir further including a hose attached to the bottom of the reservoir, and a water metering valve for dispensing water communicating with said hose;
   (e) a second angled tool bar;
   (f) parallel extension members secured at one end to said first angled tool bar and at the other end to said second angled tool bar;
   (g) an upper frame assembly rigidly attached to said second angled tool bar;
   (h) a vertical rear pivot shaft rigidly affixed to said upper frame assembly;
   (i) a front frame pivot shaft complimentarily angled at the top and rigidly affixed to said second angled tool bar;
   (j) a front frame assembly pivotally attached to said front frame pivot shaft;
   (k) a furrow opening assembly comprising a combination:
     (1) first vertical strut members rigidly attached at one end to said front frame assembly;
     (2) a rolling coulter attached to the other end of said vertical strut members;
     (3) a second vertical strut member attached at one end to said front frame assembly rearward of said rolling coulter;
     (4) two flat discs attached to the other end of said second vertical strut member in a manner such that said flat discs are on opposite sides of said rolling coulter and are at an angle to the vertical;
     (5) a point of reference on the circumference of said flat discs which is determined as follows:

(a) draw a circle and bisect it with horizontal and vertical lines through the center, let that circle represent the face of the discs, and in the lower right quadrant bisect the circumference of the circle with radius 45° below the horizontal, that point on the circumference where the radius bisects it will represent the closest point at which the discs must be angled together to achieve the optimum opening results, said flat discs so angularly mounted and operated below the surface of the soil, laterally move soil, in two directions forming a furrow;

(6) A v-shaped boot rigidly attached to said second vertical strut member;

(7) a pair of winged-shaped members rigidly attached to said v-shaped boot which extend backward along the furrow to hold the furrow open;

(8) two parallel rigid angled plant guides attached at one end to said wing-shaped members and at the other end to said front end frame assembly;

(1) a middle frame assembly pivotally connected to said upper frame assembly by said vertical rear pivot shaft and in slidable contact with said front frame assembly.

2. The apparatus as defined in claim 1 wherein the strut members are adjustably secured to the first angled tool bar by the following structure:
 (a) two parallel strut members positioned parallel to a plane which is perpendicular to the tool bar and adjustably affixed to the approximate ends of said tool bar so that the tool bar overlaps the parallel strut members, each adjustable affixing means comprising in combination:
  (1) two parallel plates sandwiching the tool bar and the strut members at the point of connection,
  (2) four bolts inserted through said two plates said bolts located at the corners of the two plates wherein the said overlapped tool bar and strut members are sandwiched between said bolts such that when said bolts are torqued tight the said tool bar, strut member, parallel plates, and bolts substantially take on a rigid locked condition, and yet allows for adjustment by movement of said strut narrow back and forth when said bolts are loosened.

3. The apparatus as defined in claim 1 wherein the liquid reservoir is mounted to the first tool bar by means of a set of rods circumambient said reservoir, said rods affixed to a strut assembly which is affixed to the first tool bar, and said strut assembly comprising a frame.

4. The apparatus as defined in claim 1 wherein the liquid reservoir comprises a barrel positioned horizontally above and parallel to the axis of said first tool bar.

5. The apparatus as defined in claim 1 wherein the rolling coulter is selectively adjustable to compensate for various terrains, working depths, and types of crops to be planted are varied.

6. The apparatus defined in claim 1 wherein the upper frame assembly further comprises in combination:
 (a) two frame members each horizontally angled from and affixed to one end of the second angled tool bar at their respective front ends and a second vertical pivot shaft, and being affixed to the vertical rear pivot shaft thus forming substantially a rigid equilateral triangle configuration.

7. The apparatus as defined in claim 6 wherein there is a seat support beam affixed horizontally across the top of the upper frame to allow for attachment of worker seats.

8. The apparatus defined in claim 1 wherein the front frame assembly comprises:
 (a) two horizontal parallel side rails;
 (b) a front cross member affixed to the forward end of said horizontal parallel side rails thus forming a 90° angle at the points of attachment;
 (c) a pivot block affixed frontally over the center of the front crossmember for pivotal connection with the front frame pivot shaft;
 (d) a rigid member positioned and affixed across the top of said horizontal parallel side rails, said rigid member protruding out on each side of said horizontal parallel side rails to allow for attachment of ballast weights which will provide effective soil penetration by the coulter and the furrow opening assembly;
 (e) first bearing pads affixed to the inside of said horizontal parallel side rails at the rearward ends.

9. The apparatus defined in claim 8 wherein there are two equal ballast weights mounted to the horizontal parallel side rails and located directly over the furrow opening discs to provide adequate soil penetration.

10. The apparatus of claim 8 wherein the amount of ballast weight is selectively adjustable wherein various terrains may be penetrated.

11. The apparatus as defined in claim 8 which further comprises a rear press wheel assembly pivotally connected to the vertical downward extension of the middle frame assembly and wherein the bearing pads are set on a point of intersection of a centerline of a furrow opener and a centerline of said rear press wheel assembly and wherein said bearing pads laterally bear on the upper frame member extensions so as to steer said rear press wheel assembly along the same path as taken by the furrow opener when the apparatus is towed from a straight path.

12. The apparatus as defined in claim 1 wherein the middle frame assembly comprises:
 (a) two horizontal parallel frame members each having at one end a 90° bend forming a vertical downward extension;
 (b) second bearing pads affixed to the downward end of said vertical downward extensions, said second bearing pads being in slidable contact with the first bearing pads of the front frame assembly;
 (c) a pivot block located between and rigidly affixed to said horizontal parallel frame members at the ends opposite said verticle downward extensions, said pivot block pivotally connected to the verticle rear pivot shaft.

13. The apparatus as defined in claim 12 including a one-row transplanting machine attached to the first tool bar by means of two frame extensions which are secured by bolts.

* * * * *